United States Patent [19]

Hegler et al.

[11] 4,212,618

[45] Jul. 15, 1980

[54] APPARATUS FOR THE MANUFACTURE OF TRANSVERSELY CONTOURED TUBING FROM THERMOPLASTIC MATERIAL

[75] Inventors: Wilhelm Hegler, Goethestrasse 2, Bad Kissingen, Fed. Rep. of D-8730 Bad Kissingen, Fed. Rep. of Germany; Ralph-Peter Hegler, Bad Kissingen, Fed. Rep. of Germany

[73] Assignee: Wilhelm Hegler, Bad Kissingen, Fed. Rep. of Germany

[21] Appl. No.: 54,417

[22] Filed: Jul. 3, 1979

[30] Foreign Application Priority Data

Jul. 22, 1978 [DE] Fed. Rep. of Germany ....... 2832350

[51] Int. Cl.$^2$ ........................ B29C 17/07; B29D 7/22

[52] U.S. Cl. ................................ 425/326.1; 264/508; 264/563; 264/564; 425/233; 425/325; 425/369; 425/371; 425/392; 425/396

[58] Field of Search .................... 425/325, 326.1, 369; 264/508

[56] References Cited

U.S. PATENT DOCUMENTS

| | | | |
|---|---|---|---|
| 3,557,404 | 1/1971 | Zippel et al. | 425/233 |
| 3,751,541 | 8/1973 | Hegler | 425/326.1 |
| 3,776,679 | 12/1973 | Hegler | 425/325 |
| 3,859,025 | 1/1975 | Maroschak | 425/326.1 |
| 3,981,663 | 9/1976 | Lupke | 425/326.1 |
| 3,996,323 | 12/1976 | Hegler et al. | 425/326.1 |
| 4,021,178 | 5/1977 | Braun | 425/325 |
| 4,147,809 | 4/1979 | Thompson | 425/325 |

FOREIGN PATENT DOCUMENTS 1231682 5/1971 United Kingdom .

*Primary Examiner*—Walter C. Danison

*Attorney, Agent, or Firm*—Browdy and Neimark

[57] ABSTRACT

An apparatus for the manufacture of transversely contoured tubing from thermoplastic material. The tube emerges in the plastic state from an extrusion nozzle and is guided into a mold composed of a plurality of mold sections in series, with inner side working surfaces forming the transverse contours. Each of the mold sections is composed of two mold halves which are arrayed along a straight molding run in two confronting rows and which are circulated. In the circulation, the first two mold halves are moved apart and out of the molding run at the end of the molding run and are guided to a return run on which they are separately returned to the beginning of the molding run where they are rejoined to the preceding mold half. The mold halves are guided on the return run in a continuous, accelerated and then decelerated movement by a transfer mechanism which couples and uncouples from the mold halves as actuated by pneumatic cylinders under the control of limit switches.

21 Claims, 7 Drawing Figures

27
28
34
26'
29
31
8
7
19
30
20
26
13
18
20
25
24
23
21
22
5
6
2
3
4
4
14
1
15
16
32
12
9
30
33
26
13
18
19
25
20
17
21
22
26'

76
77
77
78
35
37
38
88
44
91
41
42
66
1
8
75
74
11
18
9
10
74
75
51
40
87
89

84
83
85
80
76
79
82

4
2 (3)

44
77
82
79
81
85
76
69

2
3
40
40
1
41
66
42
46
45
17
36
91
s
42
66
41

76
82
79
81
85
91
77
35
2
3
11
73
18
44
60
66
65
8
73
9

40
39
61
60
44
43
41
4
3
62
1
64
65
63

APPARATUS FOR THE MANUFACTURE OF TRANSVERSELY CONTOURED TUBING FROM THERMOPLASTIC MATERIAL

FIELD OF THE INVENTION

The invention relates to an apparatus for the manufacture of transversely contoured thermoplastic tubing.

Transversely contoured plastic tubing, especially tubing having a corrugated longitudinal cross-section or helical corrguations, is manufactured in a known manner, as a rule, on apparatus in which the tube emerges in the plastic state from a nozzle and the nozzle is followed by circulating mold halves disposed in two confronting rows and joining in pairs along a rectilinear molding run to form a closed hollow mold having on its inside the shaping surfaces which produce the contours on the tubing. The tube is forced against the working surfaces of the mold either by internal overpressure or by the aspiration of the air from without. After the tube has sufficiently hardened, the mold halves separate and are returned along a return run to the beginning of the molding run.

DISCUSSION OF THE PRIOR ART

Apparatus is known in which the mold halves are linked together by means of connecting links and bolts to form an endless chain which is guided over pulleys or sprockets (see, for example, German Auslegeschrift No. 2,061,027 and U.S. Pat. No. 3,776,679). In these known apparatus a relatively large number of mold halves is required, of which only the smaller number is situated in the molding run while the rest are between the opening point and the closing point on the return run and the arcuate turnaround sections.

An apparatus is also known (German Offenlegungsschrift No. 1,918,336 and British Patent No. 1,231,682) in which the successive mold halves are not joined together, and each mold half in a series is connected at the end of the molding run to a power cylinder which can move transversely of the direction of movement of the molding run, then it is removed from the molding run, transferred to the return run, and again released. On the return run the mold halves are then returned in close order by an intermittent movement by means of another power cylinder, the foremost mold half in the return run being coupled to another power cylinder, pushed back into the molding run, and joined to the preceding mold half.

With this known apparatus, a certain saving of mold halves can be achieved, since the turnarounds which a chain of continuously running mold halves necessitates are eliminated.

Now, it has been found that, in the manufacture of plastic tubing with ever increasing tube diameters—for example from 250 mm up—the manufacture of the molds or of the individual mold halves, which must be very precisely made, involves extremely great expense.

OBJECTS AND SUMMARY OF THE INVENTION

The invention sets out from an apparatus for the manufacture of transversely contoured thermoplastic tubing, in which the tube emerges in the plastic state from an extruding nozzle, having circulating mold halves disposed in two confronting rows starting from the extruding nozzle, which join together in pairs along a molding line to form a closed hollow mold having working surfaces on its inside which shape the transverse contours, each of the unconnected mold halves of a row being connected at the end of the molding line to a transfer means moving substantially transversely of the direction of movement of the molding run, removed from the molding run and transferred to a return run, and carried on the latter back to the beginning of the molding run where it is introduced back into the molding run by a transfer means and placed against the preceding mold half. A principal object of the invention is to so construct such an apparatus that only the smallest possible number of circulated mold halves will be necessary.

This object is accomplished in accordance with the basic concept of the invention in that the mold halves are separated from one another in the return run and return at an average speed such that the return time for each mold half is shorter than the time which a mold half requires in the molding run for advancement by a distance corresponding to its own length.

In one preferred embodiment of the invention, these functions are performed by transfer and return means for the mold halves which include a carriage guided on a rail along the mold return run, the carriage having a swivel arm on whose free end is disposed a coupler that engages a mold half, the movements of the swivel arm and the movements of the carriage being brought about by suitable power means.

In the apparatus of the invention a considerable number of mold halves, almost 50%, can be dispensed with in comparison with the above-mentioned apparatus of German Offenlegnungsschrift No. 1,918,336 (GB Patent No. 1,231,682) inasmuch as fewer mold halves are in the return run than are in the molding run, and they are driven at a higher average speed than they are in the molding run.

In an especially advantageous embodiment of the apparatus of the invention there is only one mold half in each return run, and it is returned to the beginning of the molding run in a continuous movement that is first accelerated and then retarded.

Particularly in the case of the larger tubing diameters, this results in a considerable saving in the overall cost of the entire apparatus.

A further advantage of the apparatus of the invention is that, due to the small number of mold halves required, the apparatus can be converted quickly and without great expense to a different tubing diameter, which again is especially important in the production of tubing of relatively great diameter, since it generally has to be manufactured in smaller quantities, and it is not feasible to produce one complete apparatus for every tubing diameter.

Furthermore, the apparatus of the invention offers savings in the manufacture of special shapes of tubing, and in the manufacture of transitions, couplings, etc., since only a very limited number of the costly mold halves needs to be stocked for these special products.

It has proven to be especially advantageous for the transfer means to be constructed simultaneously as a return means, each mold half being attached at the end of the molding run to the return means and released from it at the beginning of the molding run after its reinsertiion into the molding line, whereupon the return means is returned to the end of the molding run. At the same time, the attachment and release of the mold halves can be actuated by electrical limit switches disposed on the molding run.

It has been found to be very desirable for the power means that actuate the carriages and swivel arms to be pneumatic cylinders. As will be further explained below in conjunction with an embodiment, they are best adapted for performing the necessary strong acceleration and retarding actions.

BRIEF DESCRIPTION OF THE DRAWINGS

An embodiment of the apparatus of the invention will be described hereinbelow in conjunction with the appended drawings.

DESCRIPTION OF PREFERRED EMBODIMENTS

Figure 1:
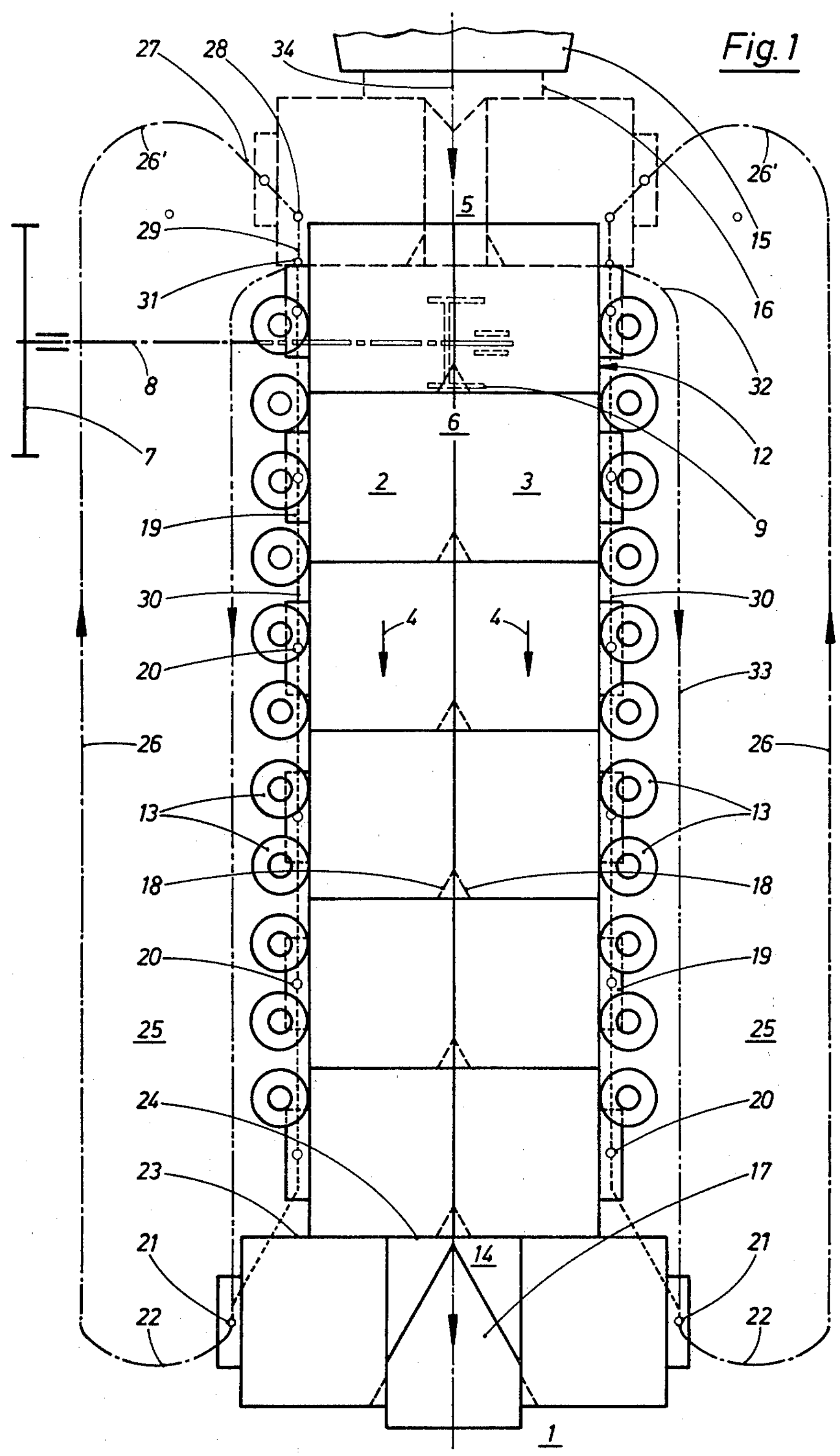
FIG. 1 is a simplified plan view representation of an apparatus of the invention which serves to explain the basic concept thereof.

In the apparatus diagrammatically represented in FIG. 1, mold halves 2, 3 are disposed on a base plate 1 in two confronting rows moving on the molding line in the direction of the arrows 4, the confronting mold halves 2, 3 on the molding line forming mold sections which stand in line and are in close engagement with one another, thus making up a closed hollow mold in which the tube emerging from an extrusion nozzle 15 fed by a plastic extruder machine is contained in a manner not shown. For the continuous linear advancement of the total of seven pairs of mold halves in the direction of the arrows 4, in FIG. 1, there is disposed immediately following the beginning 5 of the molding line 12, below the base plate 1, a drive shaft 8 which is driven by a drive wheel 7 and which turns the gear 9 which reaches through an opening in the base plate 2 to engage teeth 11 disposed on the underside of the mold halves. The mold halves 2, 3 are guided in a straight line along the molding line 12 by guide rollers 13. As a result of the driving of the pair of mold halves 2, 3 disposed in each case at the beginning 5 of the molding line, the mold halves are advanced all the way to the end 14 of the molding line 21. At the end 14 of the molding line 12 a wedge plate 17 is disposed, which cooperates with slanting surfaces 18 provided on the front inside edge of the mold halves 2,3 so that when the confronting mold halves 2,3 encounter the wedge plate 17 they are pushed apart transversely of the direction of their movement on molding line 12. On the outside of the mold halves 2,3 there are disposed the cleats or lugs 19 at which the mold halves 2,3 can be attached to a return means which is not shown in FIG. 1. For a better understanding of the manner of operation of the apparatus, one point of attachment 20 is indicated on each cleat 19 in FIG. 1.

The complete mold 6 made up of the various adjacent mold halves 2,3, is closed except at the ends and contains the aforementioned plastic tube 16 and imparts to it external features, for example transverse grooves, as described, for example in U.S. Pat. No. 3,776,679.

As soon as the point of attachment 20, upon the separation of the mold halves 2,3, reaches the end of the molding line 12, the point of attachment 20 is in a certain position marked 21, the two mold halves 2,3 are attached to the return means, which is not shown in FIG. 1, are removed from the molding line 12, and are pulled laterally out of the molding line 12 along a curved path 22. The curvature of the section 22 in the direction of the lateral pullout, the rear faces 23 of the mold halves 2, 3 still abut against the front faces 24 of the subsequent mold halves 2, 3 and thus share in the forward motion. Once two sequential sets of mold halves 2,3 are out of contact, the track 22 may curve toward the rear.

Subsequently the two mold halves 2, 3 are moved to the rear along a return track 25 located laterally adjacent to the mold line 12. The various parts and sections of the molds and other elements of the apparatus which travel on one side or the other of the symmetry line of the apparatus will carry the same reference numerals even though the actual construction is mirror symmetrical. The mold halves 2, 3 are transported in a straight line along the return track 25 shown in dash-dotted lines until they arrive adjacent to the front end 5 of the mold line 12. The straight line portion 26 of the return track is continued as a curved section 26', approximately a circular sector, on which the target point 20 of a particular mold half 2,3 is constrained to move. The initial curvature of this track 26' is in opposition to the direction of motion 4. Attached thereto is a straight track 27 which forms an acute angle with respect to the direction of motion 4. While traveling on the curved section 26' and the straight line section 27, the mold halves 2,3 approach one another and eventually reform a complete mold section 6. The approach is complete when the target points arrive at the end 28 of the track 27. On a subsequent short straight line portion 29 of the track, the return mechanism is still attached to the particular cleat 19 and continues to be so attached until the guide rollers 13 make contact with the outside surfaces of the mold halves 2,3. At the terminus 31 of the track 29, the return mechanism is uncoupled and its coupler continues to move on the curved track section 32 out of the way of the principal mold line track 30 and continues in a straight line on the track 33 up to the position indicated by the point 21.

As will be explained in more detail below, the initial motion of the mold halves 2,3 on the straight line portion 26 of the return track takes place at different velocities. The motion is initially accelerated, and is decelerated just prior to arrival of the returning mold halves at the curved track section 26', thereby being slowed down until it has just acquired the normal constant speed of motion and mold halves 2,3 in the mold line 12 when it arrives there. Upon arrival, the leading face 24 of first mold section being assembled at the front 5 of the mold line, makes contact with the rearward face 23 of the mold section just ahead of it. Thereafter, the mold halves 2,3 are pushed toward the central axis 34 until the target point reaches the position 28. While the target point 20 travels from the position 28 to the position 31, the coupler of the return mechanism is disengaged from the particular cleat 19 and the drive pinion in 9 engages the teeth 11 at the underside of the mold halves 2,3, thereby pushing the mold halves forward and imparting the same linear motion to all mold halves lying further ahead. Once the return mechanism has uncoupled from the cleat 19, the respective portions of it lying to both sides of the center line of the apparatus return to the position 21 in accelerated fashion and must reach that position before the next mold section arrives there after being seperated by the wedge plate 17.

As can be understood from FIG. 1, no more than one pair of mold halves is on the return course 25 in each case, so that no more than one extra pair of mold halves 2, 3 is needed than are contained in the complete mold 6.

An apparatus similar to that of FIG. 1 is represented more extensively in FIGS. 2 to 7 for the purpose of explaining additional details, especially with regard to the return means. The embodiment shown in FIGS. 2 to 7 differs from that of FIG. 1 in that the guidance of the mold halves 4 on the molding line 12 is provided not by guide rollers but by guide rails 35. Of course, guide rollers 13 could just as well be provided at this point in the embodiment shown in FIGS. 2 to 7. The wedge plate 17, as it can be seen in FIG. 2, has rollers 36 on the edges to reduce the friction involved in the separation of the molds at the end of molding line 12. These rollers bear against the oblique surfaces 18 during the separation.

Figure 3:
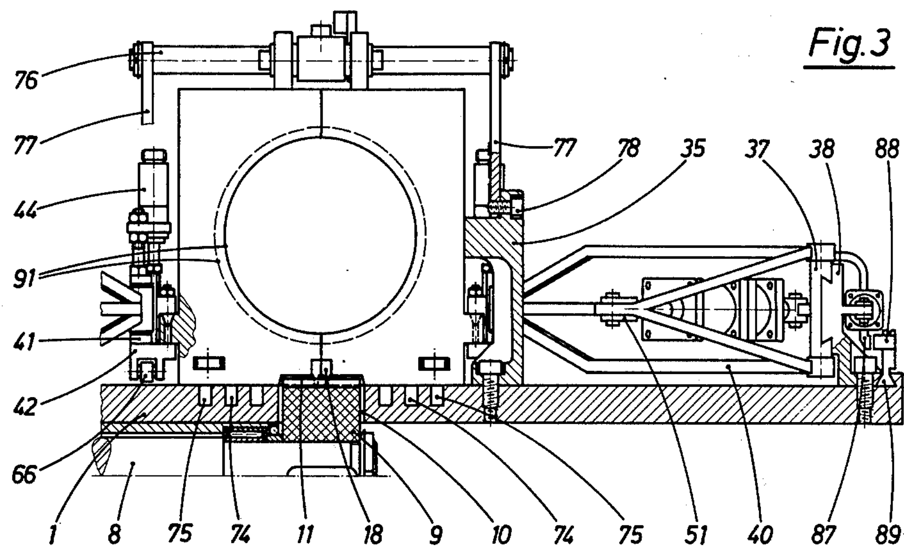
FIG. 3 is a partial cross-sectional view on a slightly enlarged scale, taken along line III—III of FIG. 2.
Figure 4:
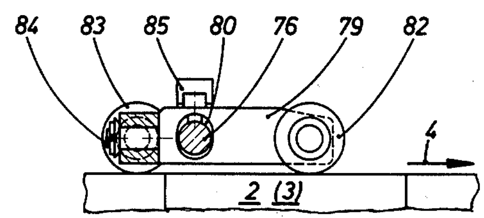
FIG. 4 is a cross-sectional view, on a slightly enlarge scale, of a detail of the apparatus of FIG. 3, taken along line IV—IV of FIG. 2.

The return means are disposed one on each side of the molding run 12. Each return means has a carriage 37 which is carried on a rail 38 disposed along the return run 25. In FIG. 3, the carriage 37 is represented as a slide which runs in dovetail engagement with the rail 38. The carriage 37 can also, of course, run on a roller guide, in which case a more friction-free operation of the carriage 37 will be achieved.

On the carriage 37 a pair of arms 39, 40 is disposed in the manner of a parallelogrammatic guide means, at whose free end pivots a gripper 41 having a lower jaw 42 and an upper jaw bearing two pins 45 and connected to the piston 43 of a pneumatic cylinder 44. During linear motions of the carriage 37, the gripper 41 always moves parallel to itself. Two conical sockets 46 are situated in each of the previously mentioned cleats or lugs 19 provided on the outer sides of the mold halves 4. The attachment of one mold half 2,3 to the return means takes place at a position of the gripper 41 in which the pins 45 are precisely above the conical sockets 46. When the pins 45 are lowered by means of the pneumatic cylinder 44, the pins 45 will then enter into the conical socket 46 and tightly grip the lugs 19 between the lower jaws 42 and the pins 45. The gripper 41, the jaw 42 and the pins 45 constitute the aforementioned coupler.

Figure 2:
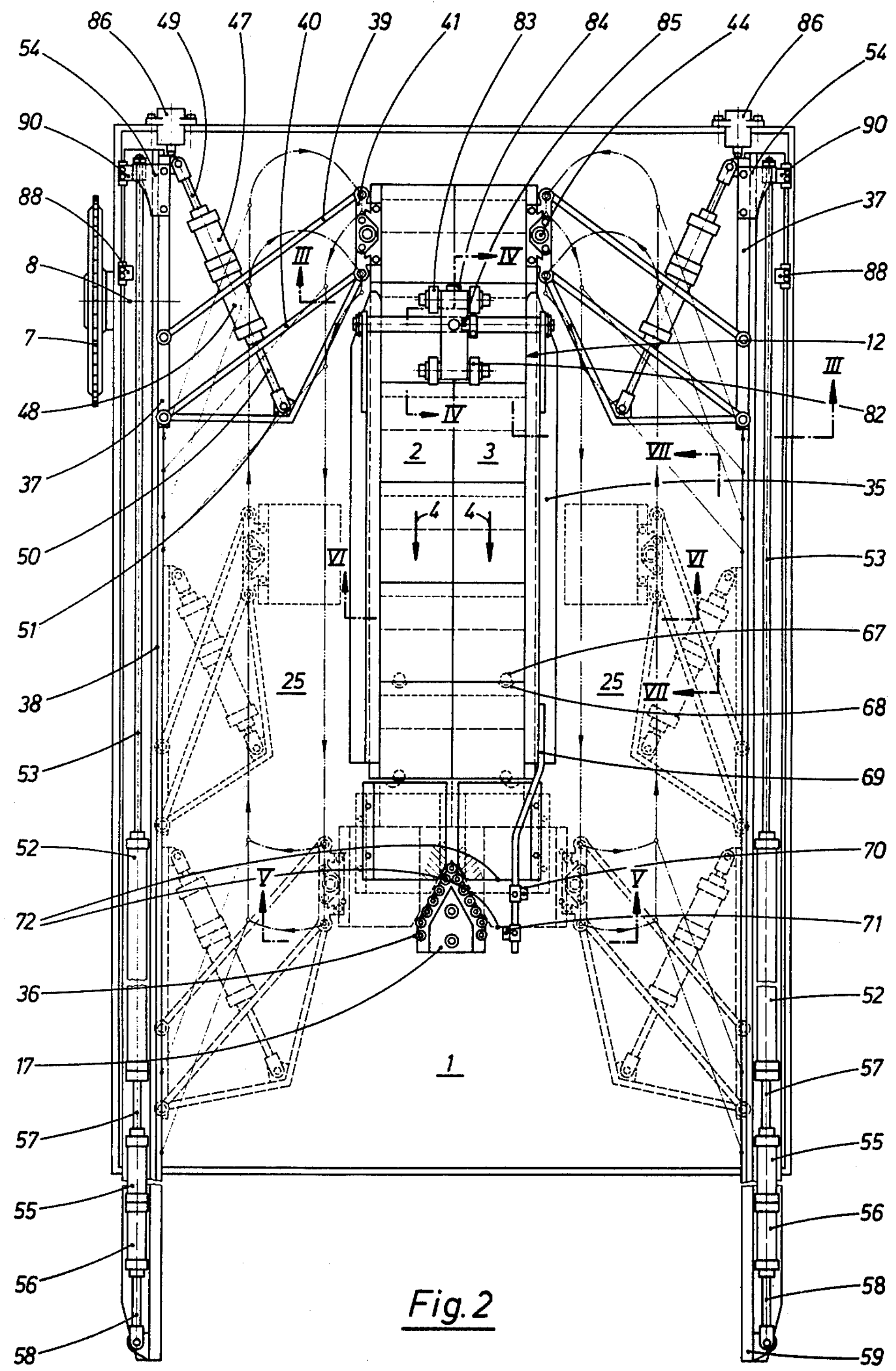
FIG. 2 is a view similar to FIG. 1 representing in detail an embodiment of the apparatus of the invention.

The arms 39, 40 are removed by two pneumatic cylinders 47 and 48 in tandem, one end of which is connected to the upper end of the carriage 37 as seen in FIG. 2, and the piston rod 50 of the cylinder 48 is attached to a protruding support 51 of the arm 40.

The movement of the carriage 37 in the longitudinal direction is accomplished by means of a long pneumatic cylinder 52 whose piston rod 53 is connected to the carriage 37 by a yoke 54. Two additional, shorter pneumatic cylinders 55 and 56 disposed in series are associated with the pneumatic cylinder 52 and serve, as will be explained further below, for the acceleration, retarding and damping.

The piston rod 57 and the cylinder 55 is attached to the cylinder 52. The piston rod 58 of the pneumatic cylinder 56 is pivotably attached to the terminus of the rail 38 on a protruding section 59.

Pivotally attached to each of the cleats is a further pneumatic cylinder 60 disposed vertically and pivotally about a horizontal axis 61 extending transversely to the directional motion 4. The downwardly extending piston rod 62 of this cylinder 60 is attached to one end of an angled lever 64 which is mounted on an axis 63 at the cleat 41. The other end of the angled lever 64 carries a roller 65 which may contact the base plate 1. The pneumatic cylinder 16, together with the angled lever 64 and the guide roller 65 constitute a lifting mechanism for the gripper permitting it and the mold half 2 or 3 attached thereto to be raised from the base plate. This disengagement is especially useful to permit friction-free and energy-saving return of the mold halves 2, 3, and also reduces wear and tear.

When the pneumatic cylinder 60 is inactive, and the gripper 41 is not attached to one of the mold halves 2, 3, the gripper rests on a support roller 66 in contact with the base plate 1. For example, the gripper 41 is supported by the support roller 66 and in turn by the base plate, while moving along the track sections 32 and 33 in the empty condition.

In order to reduce the friction between cooperating elements during the separation of mold halves 2, 3 by the wedge plate 17, a roller 67 is disposed in one of the end faces, for example the front 24 of each of the mold halves 2, 3 and extends a short distance therefrom. At the proper place in a complementary end face, i.e. the rear end face 23 in the assumed example, there is provided a mated depression 68 which receives the protruding part of the roller 67, thereby permitting the end faces 23 and 24 to be in large area, intimate contact. However, when the mold halves 2, 3 are separated by the wedge plate 17, the rollers 67 engage and roll across the rearward end face 23 of the preceding mold halves 2, 3 thereby causing the contacting mold sections to be separated from one another somewhat and thus permitting the friction-free lateral separation of the mold halves 2, 3 away from the center line of the apparatus.

Attached to one of the rails 35 is a contact bracket extending above the mold 6 substantially in the direction of the arrows 4 and in the region behind the end 14 of the mold line 12. This contact bracket 69 carries two limit switches 70, 71 whose position along the bracket is adjustable. The limit switches 70, 71 may be commercially available switches. They are actuated by the upper edge 72 of the mold half 3 which passes below the bracket 69.

As may be seen in FIGS. 2–6, there is provided in the region of the drive shaft 8, i.e. in the region of the front end 5 of the mold line 12, a counter bearing mechanism which causes the mold halves 2, 3 to be pressed against the base plate 1 so that the engagement of the drive pinion 9 in the gear teeth of the mold halves 2, 3 does not cause the mold halves to be lifted from the base plate 1. Such a lifting must be prevented because the base plate 1 contains air channels 73 (see FIG. 6) which communicate with appropriate complementary openings not shown in the surface of the base plate 1 which in turn communicate with channels in the mold halves 2, 3 for the purpose of transporting air to and from the interior of the mold 6 so as to cause the plastic pipe 16 to attach to the interior wall of the mold 6. One example of the disposition and construction of the vacuum channels in the mold halves is described in the British patent No. 971,021. In order to provide external cooling for the mold halves 2, 3, the base plate also contains water supply channel 74 and water return channel 75. Examples of such cooling water channels are described, for example, in U.S. Pat. No. 3,776,679.

The counter-bearing mechanism which presses the mold halves 2, 3 on the base plate 1 while the drive pinion 9 engages the teeth 11 prevents leakage and loss of vacuum and/or coolant.

The counter-bearing mechanism includes counter pressure shafts 76 held in support 77 which are attached by bolts 78 to the tracks 35. The shaft 76 carries the shaft block 79 in a bore 80. An adjustment pin 80 permits the adjustment of the counter pressure with which the mechanism pushes the mold halves 2, 3 onto the base plate 1. At the front end of the bearing block 79 as seen in the direction of motion 4, two pressure rollers are rotatably mounted and press down on the respective ones of the mold halves 2, 3. At the rear end of the bearing block 79, as seen in the direction of motion, two further pressure rollers 83 are located which are capable of rotation as well as pivoting with respect to an axis defined by a pin 84 extending in the direction of motion 4. This provision permits a uniform counter pressure support and also acts as a safety feature so that the pressure rollers 83 pivot around the pin 84 and actuate a limiting switch 84 if one of the mold halves 2, 3 does not appear in position at the proper time and the entire apparatus is then arrested.

In order to decelerate the carriage 37 at the end of the return motion, there are provided shock absorbers 86.

The overall management of the various motions of the mechanism is controlled by a number of limiting switches whose operation will be described below in connection with the description of the function of the apparatus.

Figure 5:
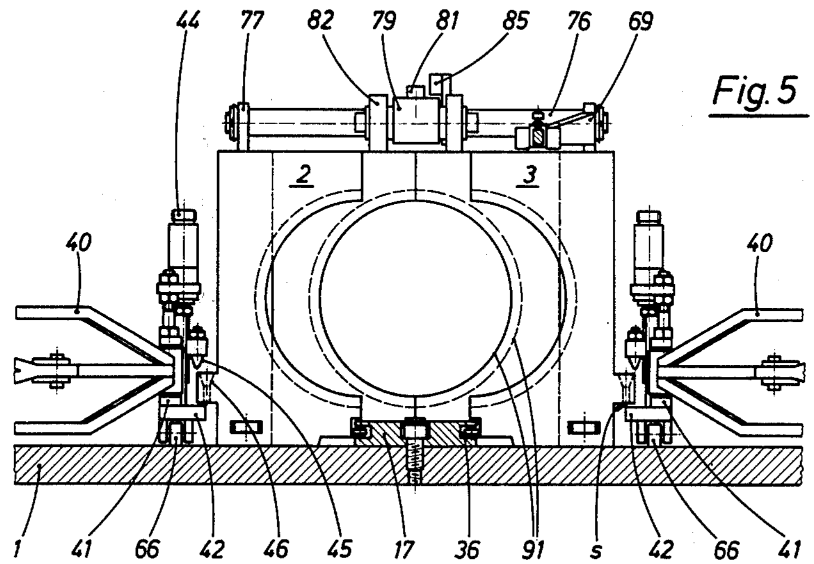
FIG. 5 is a cross-sectional view taken along line V—V in FIG. 2.

Assuming as the initial position of the mold halves 2, 3 to be that in which they are partially separated by wedge plate 17, i.e. to be the first in line in the mold line 12. In this position, the front upper edge 72 of the mold half 3 actuates the electrical contact of the limiting switch 71, thereby applying compressed air to the pneumatic cylinder 44 of the coupler standing by in position 21 and causing its piston rod 43 and the pins 45 to be pressed downwardly to engage the conical sockets 46 of the associated cleat 19. In the force-free configuration, as best seen in FIG. 5, there is a play of magnitude s of approximately 1–2 mm between the low arm 42 of the gripper 41 and the bottom of the associated cleat 19. Accordingly, the pressure of the pins 45 in the conical sockets 46 raises the entire coupler by the amount s until the arm 42 makes contact with the bottom of the cleat 19. This motion releases the support roller 66 from the top of the base plate 1 as seen in FIG. 3. This terminates the coupling of gripper 41 to the adjacent mold half 2 or 3. Thereafter, a per se known control mechanism causes the application of compressed air to the zones 48 and 56, causing the respective piston rods 50 and 58 to retract. Accordingly, the associated mold half 2 or 3 is completely pulled out of the mold line 12 along the curved track section 22. At the end of the curved track section 22, i.e. at the beginning of the long straight line section 26 of the return line 25 compressed air is applied to the cylinder 60, causing its piston rod 62 to extend downwardly so that the gripper 41 is lifted and supported on the base plate 1 by the rollers 65. At the same time, the cylinders 52 and 56 are also supplied with compressed air so that their piston rods 53 and 58 extend, and accelerate the carriage 37 with the attached mold half 2 or 3 to a velocity of up to 5 meters per second along the straight line track section 26 and in the direction of the end 5 of the base plate 1.

Just prior to reaching the terminal position, a contact pin 87 actuates a limit switch 88. The contact pin 87 is attached to the bottom of the bracket 54 at the front end of the carriage 37. The lengthwise position of the limit switch 88 on an appropriate rail 89 is adjustable and settable. The setting of the limit switch 88 is such that the point 20 on the cleat arrives simultaneously at the end of the straight section 26 and at the beginning of the curved section 26'. The actuation of the limit switch **80*a* causes compressed air to be applied to the pneumatic cylinders 47 and 48, thereby extending their piston rods 49 and 50. Accordingly, the gripper 41 with the attached mold half 2 or 3 travels on the curved section 26' toward the mold line 12. At the same time, compressed air is applied to the pneumatic cylinder 60 thereby retracting its piston rod 62 and lowering the mold half 2 or 3 which had been lifted from the base plate during the motion along the track section 26. Simultaneously, a valve (not shown) of the cylinder 55 is opened permitting its piston rod 57 to be decelerated by the force of the moving mass consisting of the carriage 37, the parallelogrammatic arms 39, 40, the gripper 41 and mold halves 2, 3. The remaining damping and deceleration is performed by the two shock absorbers 86. At the time when all of the piston rods 58, 57, 53 of the cylinder 56, 55, 52 are extended and the shock absorber 86 is compressed, the contact pin 87 actuates a terminal limit switch 90 which marks the final position of the carriage 37 whose longitudinal position is also adjustable. The actuation of this limit switch causes compressed air to be applied to the pneumatic cylinders 52 and 56, which retracts the piston rods 53 and 58. This actuation causes the motion of the mold halves 2, 3 still attached to the gripper 41 along the track section 27 until such time as the front face 24 of the laterally approaching mold halves 2, 3 makes contact with the rear surface 23 of the preceding mold halves 2, 3. Pneumatic cylinders 52 and 56 aided by the cylinders 47, 48 are not capable of moving the complete mold 6 consisting of the plurality of mold sections but are able only to push the newly arrived and closed mold halves 2, 3 against the mold sections already in place until such time as the leading mold half 3 actuates the limit switch 70 at the onset of separation of the mold halves 2, 3 by the wedge plate 17. This is so because the complete mold 6 is moved by the drive pinion 9 and because high frictional forces are generated between the mold 6 and the base plate 1. The actuation of the limit switch 70 applies compressed air to the cylinders 44 and 47 which retracts their piston rods. This action uncouples the gripper 41 from the associated mold halves 2, 3 and also moves the gripper 41 out of the track 30 on which the cleats 19 travel and into the curved section 32. The pneumatic cylinders 52 and 56 are already actuated in the sense of retracting their piston rods 53 and 58, thereby accelerating the motion of the carriage 37 on the straight track section 33 until they reach the position 21. The forward motion of the carriage 37 is damped by the air cushion within the pneumatic zone 56. In the position 21, the carriage 37 must be at rest before the arrival of the next pair of mold halves 2, 3 under the tranverse force of the wege plate 17. Thereafter, the limit switch 71** is actuated and the next cycle begins.

Figure 6:
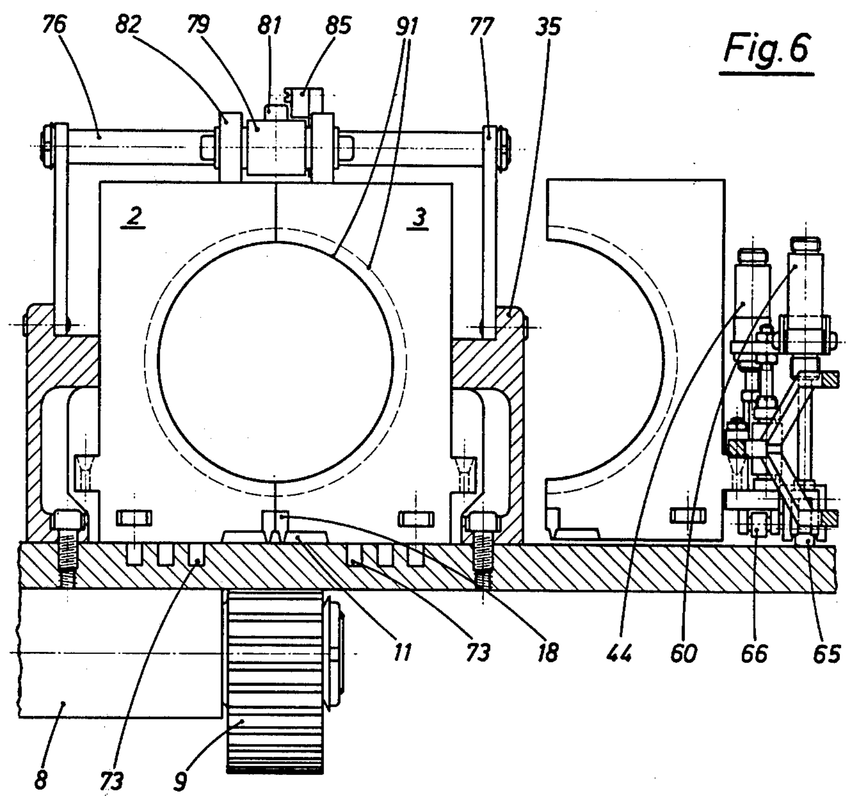
FIG. 6 is a cross-sectional view taken along line VI—VI of FIG. 2.
Figure 7:
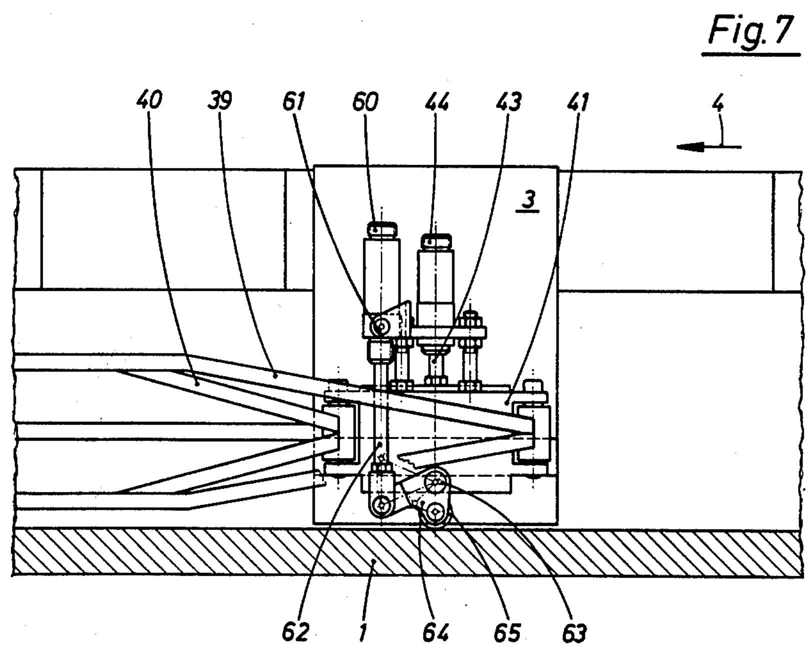
FIG. 7 is a cross-sectional view taken along line VII—VII of FIG. 2.

The internal working surfaces 91 of the mold halves 2, 3 which impart the lateral grooves to the plastic tube 60 may be seen, for example, in FIGS. 3, 5 and 6.

The foregoing relates to the preferred exemplary embodiment of the invention, and other embodiments and variances are possible within the scope and spirit thereof.

What is claimed is:

1. In an apparatus for the manufacture of tubing from a thermoplastic material comprising an extrusion nozzle which supplies a tube of thermoplastic material in a plastic state, a mold train in facing relationship to said extrusion nozzle, which mold train comprises at least two pairs of cooperating mold halves, means for moving said pair of mold halves along a straight molding run, first transfer means for separating said mold halves, return means for returning the separated mold halves along separate return runs to a position facing the nozzle and second transfer means for re-joining said separated mold halves, and wherein the improvement comprises that said first transfer means, said second transfer means and said return means are a single entity including a carriage, pivotable arm means being attached to said carriage for movably supporting a gripper for releasable attachment to one of said mold halves, there being provided means to cause the continuous motion of said gripper from one end of said molding run to the other.

2. An apparatus according to claim 1, wherein said pivotable arm means is a pair of parallelogram arms 39, 40, two respective ends of which are attached to said carriage 37 and the other respective ends of which are attached to said gripper, whereby the angular orientation of said gripper with respect to said carriage remains constant during motions of said pivotable arm means.

3. An apparatus according to claims 1 or 2, wherein said carriage 37 is constrained to move along a track 38 and is caused to so move by at least one pneumatic cylinder 52, 55, 56.

4. An apparatus according to claim 1, wherein said pivotable arm means are pivoted by at least one pneumatic cylinder 47, 48.

5. An apparatus according to claim 3, further comprising two series-connected pneumatic cylinders 52, 55, 56; 47, 48, for powering the motion of said carriage 37 and/or said pivotable arm means 39, 40.

6. An apparatus according to claim 1, further comprising a pneumatic cylinder 44 attached to said gripper 41 the actuating piston 43 of said pneumatic cylinder 44 being provided with pins 45 for engaging conical sockets 46 disposed on said mold halves 2, 3.

7. An apparatus according to claim 6, wherein said conical sockets 46 are disposed in cleats 19 attached to the exterior of said mold halves.

8. An apparatus according to claim 7, wherein said gripper 41 has a lower jaw 42 for reaching underneath said cleat 19.

9. An apparatus according to claim 1, further comprising a support roller 46 attached to said gripper 41 and actuated by a pneumatic cylinder 60 via an angled lever 64.

10. An apparatus according to claims 1, further comprising a wedge plate 17 disposed at the terminus of said molding line for engagement with oblique surfaces 18 of said mold halves; said engagement causing lateral separation of said mold halves from one another.

11. An apparatus according to claim 10, further comprising rollers 36 mounted on the wedge surfaces of said wedge plate 17.

12. An apparatus according to claim 1, further comprising lateral guide brackets 35 for guiding the rectilinear motion of said mold halves in said molding run 12.

13. An apparatus according to claim 1, further comprising guide rollers 13 for guiding the rectilinear motion of said mold halves on said molding run 12.

14. An apparatus according to claim 1 wherein a roller 67 is disposed on the face of said mold halves 2, 3 which leads in a direction of motion along said molding run 12, said roller being received by a complementary depression 68 in the rear face 23 of the preceding mold half when the mold halves are closed.

15. An apparatus according to claim 1, further comprising a bearing block 79 equipped with pressure rollers 82, 83 and disposed to bear on the top surface of said mold halves.

16. An apparatus according to claim 15 wherein the pressure rollers 83 nearest the front end 5 of the molding run 12 are pivotable about an axis coincident with the direction of motion 4 and cooperate with a limit switch 85 which is capable of arresting the apparatus.

17. An apparatus according to claim 1, wherein said mold halves are returned to the initial position along a return track which includes a curved section 22 leading away from the molding run 12, a rectilinear section 26 along which the mold halves move in opposition to the direction of motion 4, subsequently to a second curved section 26', leading into a short straight line portion 27 disposed at an acute angle with respect to the direction of motion, and thereafter leading into a straight line section 29 in the direction of motion 4.

18. An apparatus according to claim 17 wherein said transfer means can move said gripper along a third curved section 32 leading laterally away from but still in the direction of motion 4 and subsequently onto a rectilinear section 33 up to the terminus 14 of the molding run 12.

19. An apparatus according to claim 18 further comprising limiting switches 70, 71 88, 90 for selective control and actuation of the pneumatic cylinders 52, 55, 56 which provide for the rectilinear motion of the carriage 37, the pneumatic cylinders 47, 48 which pivot the pivotal means 39, 40 and the pneumatic cylinder 44 for coupling said gripper 41 to one of said mold halves 2, 3.

20. An apparatus according to claim 1, further comprising at least one shock absorber 86 located in the starting region 5 of said molding run 12 at the terminus of motion of said carriage 37.

21. An apparatus according to claim 3, wherein at least one of said pneumatic cylinders 52, 55, 56 which actuates said carriage 37 is a braking cylinder.

* * * * *